United States Patent [19]

Ishikawa et al.

[11] Patent Number: 4,873,586
[45] Date of Patent: Oct. 10, 1989

[54] METHOD AND APPARATUS FOR REPRODUCING AUDIO AND VIDEO DATA FROM A DISK

[75] Inventors: Kazushige Ishikawa; Kenji Mochizuki; Toshihiro Maehara; Masaharu Hagiri, all of Saitama, Japan

[73] Assignee: Pioneer Electronic Corporation, Tokyo, Japan

[21] Appl. No.: 190,807

[22] Filed: May 6, 1988

[30] Foreign Application Priority Data

May 8, 1987 [JP] Japan .................................. 62-112944

[51] Int. Cl.$^4$ .............................................. G11B 7/00
[52] U.S. Cl. .................................... 358/342; 358/341; 360/72.1; 360/72.2; 360/35.1; 369/30; 369/33
[58] Field of Search ................... 360/35.1, 72.1, 72.2, 360/32, 19.1; 358/342, 341, 343; 369/32, 33, 47, 30

[56] References Cited

U.S. PATENT DOCUMENTS 4,779,252 10/1988 Custers et al. .................. 369/30 X
4,817,075 3/1989 Kikuchi et al. .................. 369/33 X Primary Examiner—Robert L. Richardson
Attorney, Agent, or Firm—Sughrue, Mion, Zinn, Macpeak & Seas

[57] ABSTRACT

A disk reproducing method and apparatus in which, when a piece of music is reproduced, its associated video data is reproduced in the form of a still picture image. In the inter-music portion between the reproduction of pieces of music, the video data corresponding to the sequentially reproduced piece of music is searched and then stored in a memory for reproduction as a still picture when the forthcoming piece of music is reproduced.

3 Claims, 1 Drawing Sheet

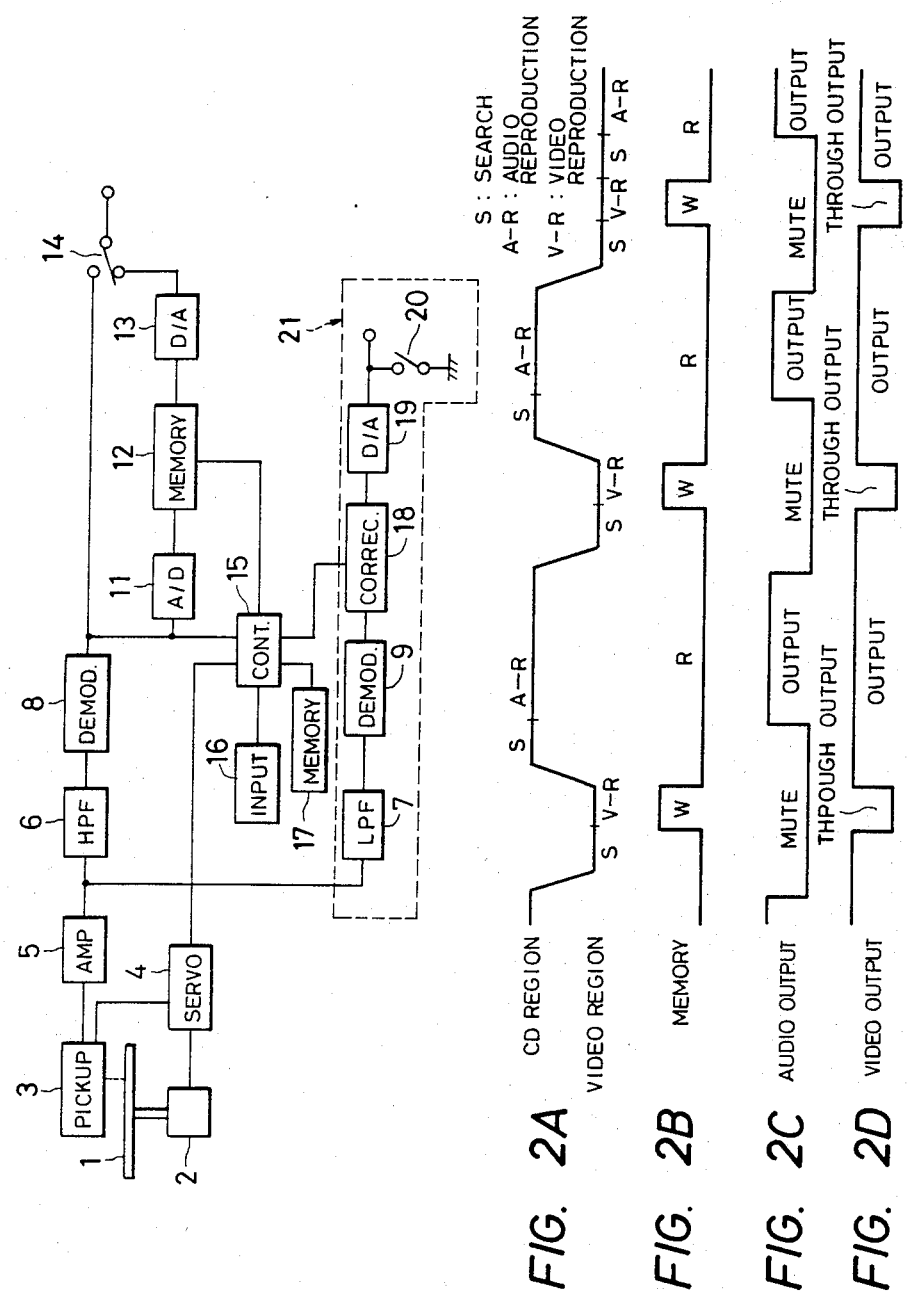

METHOD AND APPARATUS FOR REPRODUCING AUDIO AND VIDEO DATA FROM A DISK

BACKGROUND OF THE INVENTION

The present invention relates to a disk reproducing apparatus for reproducing information recorded on disks in which audio data and associated video data are recorded, such as a CD-V disk.

Compact disks (CD) are known in which only PCM audio data are recorded. Recently, a disk called a CD-V disk has been proposed, in which video data are recorded in conjunction with the audio data. The CD-V disk is divided into an inner circumferential region (CD region) and an outer circumferential region (video region). Only PCM audio data are recorded in the CD region, and both PCM audio data and FM video data are recorded in the video region. The outer circumferential portion is reserved for the video data because the frequency bandwidth of the video data is wider than that of the audio data.

When reproducing data from the CD-V disk, a linear velocity of the video region is made faster than that of the CD region. While it is possible to record normal motion pictures as the video data on a CD-V disk, still pictures corresponding to the audio data are usually recorded as the video data, since the motion pictures would have to be of limited duration because of the relatively small diameter of the CD-V compared to normal video disks.

Conventionally, it has been possible to reproduce audio data from a CD-V disk in a sequence different from that in which they were recorded. When several pieces of audio data selected from those recorded on the CD-V disk have been inputted for reproduction out of their normal recorded sequence, all of the corresponding still picture video data are searched and stored in a memory prior to the commencement of reproduction of the first piece of audio data. After completion of the storage of the video data, the program inputted audio data are successively searched and reproduced. The video data corresponding to the reproducing audio data are correspondingly successively read out of the memory, and the corresponding still picture image is reproduced.

In order to implement this approach, the conventional apparatus has had to have a large memory capacity, and thus has been expensive.

SUMMARY OF THE INVENTION

In view of the foregoing, it is a primary object of the present invention to provide a disk reproducing apparatus capable of reproducing information recorded on a disk, in which audio data and their associated still picture video data are recorded on the disk, and in which a small storage capacity memory is used for storing the still picture video data which is retrieved from the disk.

In order to achieve the above and other objects, the present invention provides a disk reproducing apparatus which includes input means for inputting numbers of a plurality of audio data to be reproduced in accordance with a desired sequence of reproduction; a first memory for storing the numbers designated by the input means; pickup means for reproducing data recorded on a disk and providing an output accordingly; an audio circuit for separating the audio data from the output reproduced by the pickup means and demodulating the audio data; a second memory for storing video data which is separated from the output reproduced by the pickup and is demodulated; and a control circuit for controlling the pickup means, the second memory and the audio circuit in accordance with the data stored in the first memory, wherein the control circuit instructs the pickup means to search for and retrieve video data corresponding to one of the audio programs which has been assigned a particular number among the plurality of numbers stored in the first memory, and to store the retrieved video data in the second memory, and then to search for the audio data corresponding to the particular number, such that when the searched audio data is reproduced, the video data stored in the second memory also is reproduced as a still picture image, these operations being carried out in sequence in accordance with the number sequence for the audio data stored in the first memory.

In operation, when several pieces of audio data are programmed, through the input means, to be reproduced in a desired sequence, numbers assigned to the respective pieces of audio data are stored in the first memory in accordance with that sequence. Video data which corresponds to the audio data of the number entered first then is searched for and retrieved. The retrieved video data is stored in the second memory. When storing of the video data in the second memory has been completed, the control circuit controls the pickup means to search and reproduce the audio data corresponding to the number entered first. At this point, the initial video data stored in the second memory is read out for reproducing as a still picture. When reproduction of the audio data is completed, the similar operation is repeated with respect to the video data corresponding to the second entered audio data.

BRIEF DESCRIPTION OF THE DRAWINGS

The foregoing and other objects and features of the present invention now will be described in detail with reference to the accompanying drawings, in which:

FIG. 1 is a block diagram showing a disk reproducing apparatus according to the present invention; and FIGS. 2A-2D are timing charts for describing the operation of the apparatus shown in FIG. 1.

DETAILED DESCRIPTION OF THE PREFERRED EMBODIMENTS

FIG. 1 is a block diagram showing a disk reproducing apparatus according to the present invention. A predetermined sequence of numbers of desired audio data (music) selected from a plurality of audio data recorded on a disk are programmed through an input means 16 which may include switches, button, keys, etc. For example, if ten pieces of music are recorded in order from 1 to 10 on the disk, a plurality of music numbers assigned to the respective pieces of music may be inputted in a desired order of reproduction, such as, for example, 2, 3, 1, 9, 8, 4, and so on. When the music numbers are inputted by the input means 16, a control circuit 15, which may comprise a microcomputer, stores the inut data in a memory 17.

On the disk 1, the music numbers for the respective pieces of music, addresses, time period of reproduction, numbers of the corresponding still picture video data, addresses of the video data, and the like are recorded as table of contents (TOC) data on a predetermined track in either the CD region or the video region. When the disk 1 is loaded into the disk player, the control circuit 15 controls a servo circuit 4 so that a spindle motor 2 rotates the disk 1 for reproducing the TOC data. The TOC data reproduced by means of the pickup 3 are stored in a memory 17 through an amplifier 5, a low-pass filter (LPF) 7, a demodulating circuit 9, a correction circuit 18 and a control circuit 15 when the TOC data are recorded in the CD region, or through the amplifier 5, a high-pass filter (HPF) 6, a demodulation circuit 8, and the control circuit 15 when recorded in the video region.

When the desired program input of the music numbers has been completed and a reproduction operation is instructed by the input means 16, the control circuit 15 controls the servo circuit 4 to effect spindle servo, focus servo, tracking servo and slider servo operations. Next, the control circuit 15 reads out of the memory 17 the video number and the addresses of the video data corresponding to the music to be reproduced first, and moves the pickup 3 to the video region through the servo circuit 4 for searching the video data identified by the video number. When a desired video data address or video number is detected from the output of the demodulation circuit 8 or the correction circuit 18, the control circuit 15 causes the video data to be reproduced, as shown in FIG. 2A.

The signal reproduced from the disk 1 by the pickup 3 is amplified by the amplifying circuit 5, and then is inputted to the high-pass filter 6. The high-pass filter 6 separates the video signal from the reproduced signal. The video signal thus separated is FM demodulated by the demodulation circuit 8. The FM demodulation output is A/D converted by an A/D converter 11, and the resulting signal is stored in a memory 12, as indicated in FIG. 2B. A part of the data written in the memory 12 is output as it is to a D/A converter 13, where it is D/A converted as shown in FIG. 2D, and then is outputted through a switch 14 to a CRT (not shown). Alternatively, the signal supplied from the demodulation circuit 8 may be outputted directly from the switch 14 while changing over the switch 14 to the upper contact in FIG. 1 during the writing operation in the memory 12.

Upon writing of one field or one from of the video signal in the memory 12, the control circuit 15 repeatedly reads the stored data therefrom as shown in FIG. 2B. As a result, the still picture video signal is outputted through the D/A converter 13 and the switch 14, according to FIG. 2D.

On the other hand, when writing of the video signal in the memory 12 is completed, the control circuit 15 moves the pickup 3 to the portion (in the CD region or the video region) where the music corresponding the first stored program number is recorded, and commands a search of the number of that music. When the music corresponding to the first program number is detected from the output of the correction circuit 18, a mute provided by a switch 20 is released, and the music is reproduced.

The RF signal outputted from the amplifier 5 is inputted to the audio circuit 21. The low-pass filter 7 in the audio circuit 21 separates the PCM audio signal component from the reproduced signal. The thus separated signal is inputted to the demodulation circuit 9 for FM demodulation. The output of the demodulation circuit 9 is inputted to the correction circuit 18 where error correction, deinterleaving, etc. are performed. The signal outputted from the correction circuit 18 is D/A converted by the D/A converter 19 and outputted to loudspeakers (not shown), according to FIGS. 2A and 2C.

When the reproduction of the music corresponding to the first program number is ended, the control circuit 15 moves the pickup 3 to the video region, again, to search for and retrieve the video data corresponding to the music of the second programmed number. The previously-stored video data is output until the next video data is detected. Accordingly, the displayed picture image is not interrupted. When the next video data is detected, it is written in the memory 12. In this manner, the pieces of music being programmed and their corresponding still pictures are sequentially reproduced.

As described above, with the disk reproducing apparatus according to the invention, it is possible continuously to reproduce video data associated with audio data by writing a different piece of still picture video data in a memory each time a different but corresponding piece of music is to be reproduced. Thus, a small-capacity memory suffices, and thus the apparatus can be manufactured at low cost.

What is claimed is:

1. A disk reproducing apparatus comprising:
   input means for inputting numbers of a plurality of audio data to be reproduced in accordance with a desired sequence of reproduction;
   a first memory for storing the numbers designated by said input means;
   pickup means for reproducing data recorded on a disk and providing an output accordingly;
   an audio circuit for separating and demodulating said audio data from the output of said pickup means;
   a second memory for storing video data which is separated and demodulated from the output of said pickup means; and
   a control circuit for controlling said pickup means, said second memory and said audio circuit in accordance with the data stored in said first memory;
   wherein said control circuit instructs said pickup means to search for and retrieve video data corresponding to one of said plurality of audio data assigned to a first number among the plurality of numbers stored in said first memory, and to store the retrieved video data in said second memory; said control circuit then instructing a search of audio data corresponding to said first number, wherein, when the searched audio data is reproduced, the video data stored in said second memory is reproduced as a still picture image; and wherein the foregoing operations are carried out in sequence for each of said numbers stored in said first memory.

2. A method of reproducing information from a disk on which both audio and corresponding video information are recorded, said method comprising:
   determining a piece of audio data to be reproduced from said disk, and identifying a number corresponding to said piece of audio data;
   retrieving a piece of video data corresponding to said piece of audio data, in still picture form, and storing said piece of video data in a first memory;
   during reproduction of said piece of audio data, reproducing said piece of video data in still picture form; and
   repeating all of the above steps in sequence for each piece of audio data to be reproduced;

wherein, for each said piece of audio data being reproduced, each said piece of video data is reproduced until a subsequent piece of audio data is to be reproduced, at which time the stored video data corresponding to that subsequent piece of audio data is reproduced.

3. A method as claimed in claim 2, wherein a sequence of audio data to be reproduced is input through input means in a disk reproducing apparatus prior to said determining step.

* * * * *